Nov. 8, 1955 G. SCHRADER 2,722,872
CONTROL MECHANISM FOR THE ELIMINATION OF
DOUBLE-EXPOSURES IN PHOTOGRAPHIC CAMERAS
Filed Dec. 11, 1952

GOETZ SCHRADER
Inventor:
L. S. Saulsbury
ATTORNEY

United States Patent Office 2,722,872
Patented Nov. 8, 1955

2,722,872

CONTROL MECHANISM FOR THE ELIMINATION OF DOUBLE-EXPOSURES IN PHOTOGRAPHIC CAMERAS

Goetz Schrader, Frankfurt am Main, Germany

Application December 11, 1952, Serial No. 325,282

7 Claims. (Cl. 95—31)

This invention relates to a control mechanism for the elimination of double-exposures in photographic cameras.

The practice is known in the case of photographic cameras, of preventing double-exposure of a film by arranging that the shutter be released only when the transporting mechanism has been adjusted one frame further. In many designs this is achieved by fitting to the film-transport shaft a cam-disc, the cams of which release the shutter-catch. For reliable operation of such a release-system, it is necessary, however, that the cam should remain in an accurately pre-determined position, so that, firstly, it is enabled to actuate the catch-element sufficiently and, secondly, it does not impede the subsequent locking-action when the catch movement again operates after the shutter has been released.

In order to obtain correct positioning of the cam in all circumstances, the cam-disc is mounted according to the invention on the film transporter shaft so as to be rotatable under pressure. Thus, when the film is adjusted, the cam-disc also rotates and a cam thereon strikes a projection of the catch-leevr which moves until it releases the shutter. The cam-disc is held in this position by the catch-lever projection even when the film transporter shaft is further rotated. To ensure that the cam-disc may be further rotated after an exposure, further movement of said cam-disc is possible, according to the invention, only after the shutter-catch has been released and the shutter operated. Since, in the new position, the catch-lever projection is once more within the operational arc of the cams, the whole process may be then repeated.

An embodiment of the invention will now be described, by way of example, with reference to the accompanying drawing in which Figs. 1 to 6 show respectively, in side elevation, six consecutive stages of operation of control mechanism for the elimination of double-exposures in photographic cameras.

Figure 1:
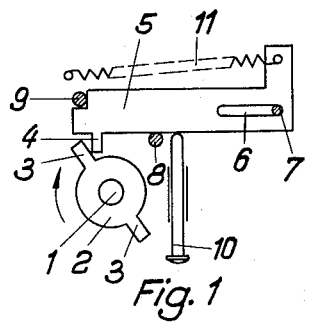
Figure 2:
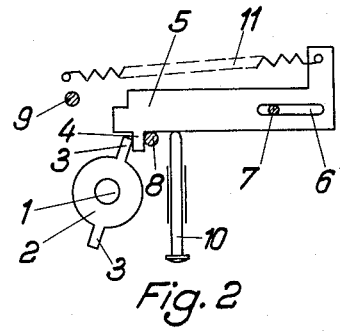

Referring to the drawing, the numeral 1 denotes a film transporter-shaft which is adapted to be rotated by hand. A cam-disc 2 is rotatably mounted on the shaft 1, rotation of the disc 2 being possible only under pressure. When the cam-disc 2 is rotated, the cams 3 thereon come into the proximity of a projection 4 on a catch-lever 5 which is displaceable by means of a slot 6 therein riding along a rigid pin 7. Movement of the lever 5 is limited by two buffers 8 and 9. The buffer 8 prevents the lever 5 falling below the horizontal and at the same time prevents horizontal displacement of the lever to the right due to the projection 4 striking against the buffer 8. The buffer 9 ensures that the control-lever 5 does not swing upwards in the lock-position so that the lever in this position can be moved only horizontally on the pin 7 by means of the slot 6. Not until the control-lever 5 has left the buffer 9 can it move upwards. A pin 10 operated from the shutter release-mechanism presses upwards against the catch-lever 5; this pin cannot therefore move until the catch lever 5 has been displaced rendering the buffer 9 ineffective. A spring 11 draws the lever 5 not only downwards against the buffer 8 but also horizontally to the left beneath the buffer 9. Fig. 1 shows the parts in the rest position. As soon as the film transporter-shaft 1 with its cam-disc 2 is rotated in the direction of the arrow (Fig. 1) the parts reach the position as in Fig. 2. Thereby, one cam 3 displaces the projection 4 of the control-lever 5 to meet the buffer 8. Consequently, the forward end of the control-lever is released from the buffer 9.

Figure 3:
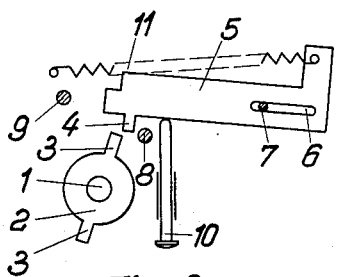
Figure 4:
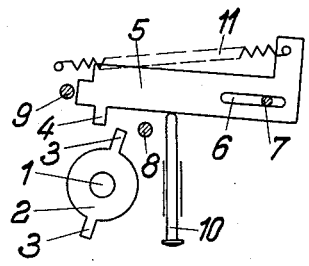
Figure 5:
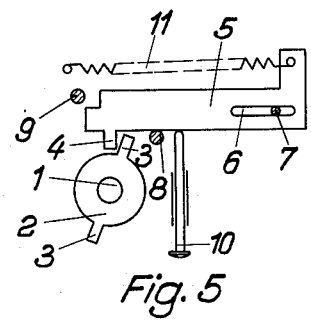
Figure 6:
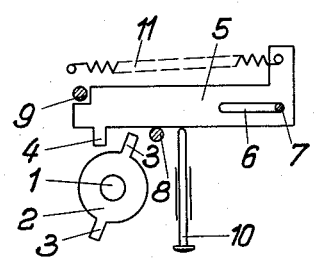

The shutter release-mechanism can now once more be operated as in Fig. 3. The lever 5 is now free of the buffer 9 and is pressed upwards by the shutter-pin 10, thus actuating, by an arrangement not illustrated, the camera-shutter. At this point, the projection 4 is raised clear of the cam 3 whereby the lever 5, under tension of the spring 11, slides to the left on the pin 7 by means of the slot 6 until it contacts the buffer 9. This position is illustrated in Fig. 4. As soon as the shutter releasemechanism 10 returns to its normal position, the spring 11 swivels the lever 5 downwards, as shown in Fig. 5. Under further tension of the spring, the forward end of the lever 5 is brought under the buffer 9 whereby the lever can no longer be raised and the shutter releasesystem is again checked. In the course of the movements as in Figs. 5 and 6, the projection 4 has been carried over and beyond the now motionless cam 3 and now no longer prevents further rotation of the cam-disc when the film transporter-shaft is required to rotate in order to position another frame. Thus, the entire device returns to the initial position as at Fig. 1.

I claim:

1. For the elimination of double exposures in photographic cameras, control mechanism comprising a rod element adapted to be operated by a shutter control mechanism on exposure of a film, lever means in contact with the free end of the rod element and mounted for longitudinal movement in the direction of its axis and for pivotal movement about a point on its axis, spring means anchored at one end to a camera body and at the other end to the lever means to pull the latter in the longitudinal direction and to pivot same in the sense towards the rod element, a first stop means fixed on the camera body adapted to arrest longitudinal movement of the lever means under the action of the spring means and to lock same against pivotal movement in the sense away from the rod element, second stop means fixed on the camera body adapted to lock the lever means against pivotal movement in the sense towards the rod element, and means actuable on rotation of a film transporter-shaft bringing a film to the exposure position to move said lever means in the longitudinal direction against the action of the spring means clear of the first stop means, and to retain same in such position to allow the lever means to be pivoted in the sense away from the rod element by movement of the latter on operation of the shutter mechanism to expose the film, the spring means after such exposure returning the lever means to the position where it is engaged by the first stop means, whereby the rod element cannot be actuated by the shutter mechanism and further exposure of the film is prevented.

2. For the elimination of double exposures in photographic cameras, control mechanism comprising a rod element adapted to be operated by a shutter control mechanism on exposure of a film, lever means in contact with the free end of the rod element and mounted for longitudinal movement in the direction of its axis and for pivotal movement about a point on its axis, said lever means having an abutment thereon, spring means anchored at one end to a camera body and to the lever means to pull the latter in the longitudinal direction and to pivot same in the sense towards the rod element, first stop means fixed on the camera body adapted to arrest longitudinal movement of the lever means under the action of the spring means and to lock same against pivotal movement in the sense away from the rod element, second stop means fixed on the camera body adapted to lock the lever means against pivotal movement in the sense towards the rod element, an abutment on the lever means, a collar element mounted on a film transporter-shaft for bringing a film to the exposure position, at least one projection on said collar element adapted on rotation of the film transporter-shaft to engage the abutment on said lever means and move said lever means in the longitudinal direction against the action of the spring means clear of the first stop means to a position whereat the abutment abuts the second stop means and is thus prevented from further movement in the longitudinal direction, and wherefrom the lever means can be pivoted in the sense away from the rod element by movement of the latter on operation of the shutter mechanism to expose the film, the spring means after such exposure returning the lever means to a position where the abutment is behind the trailing edge of the projection on said collar element which previously engaged it and the lever is engaged by the first stop means, whereby the rod element cannot be actuated by the shutter mechanism and further exposure of the film is prevented.

3. For the elimination of double exposures in photographic cameras, control mechanism comprising a rod element adapted to be operated by a shutter control mechanism on exposure of a film, lever means in contact with the free end of the rod element and mounted for longitudinal movement in the direction of its axis and for pivotal movement about a point on its axis, a spring anchored to the lever means adjacent one end of the latter and to a camera body adjacent the other end of the lever means to pull the latter in the longitudinal direction and to pivot same in the sense towards the rod element, said lever means having an indent at the end of the lever means remote from its connection with the spring providing an edge substantially parallel to the axis of the lever means and an edge substantially normal to said axis, first stop means fixed on the camera body adapted to engage in said indent to arrest longitudinal movement of the lever means under the action of the spring means and to lock same against pivotal movement in the sense away from the rod element, second stop means fixed on the camera body adapted to lock the lever means against pivotal movement in the sense towards the rod element, and means actuable on rotation of the film transporter-shaft for bringing a film to the exposure position and retaining same in position and to move said lever means in the longitudinal direction against the action of the spring so as to clear said indent of the first stop means, and to hold the lever means in such position to allow it to be pivoted in the sense away from the rod element by movement of the latter on operation of the shutter mechanism to expose the film, the spring after such exposure returning the lever means to the position where the indent is engaged by the first stop means, whereby the rod element cannot be actuated by the shutter mechanism and further exposure of the film is prevented.

4. For the elimination of double exposures in photographic cameras, control mechanism comprising a rod element adapted to be operated by a shutter control mechanism on exposure of a film, a lever having one of its longitudinal edges in contact with the free end of the rod element and having a longitudinal slot adjacent one of its ends, a pin element fixedly mounted in a camera body and passing through said slot so that the lever can move in the direction of its axis and can pivot about a point on its axis, a spring anchored to the end of the lever adjacent the slot and to the camera body adjacent the end of the lever remote from the slot to pull the lever in the longitudinal direction and to pivot same in the sense towards the rod element, first stop means fixedly mounted on the camera body adapted to arrest longitudinal movement of the lever under the action of the spring and to lock same against pivotal movement in the sense away from the rod element, second stop means fixedly mounted on the camera body adapted to lock the lever against pivotal movement in the sense towards the rod element, and means actuable on rotation of a film transporter-shaft bringing a film to the exposure position to move said lever in the longitudinal direction against the action of the spring means clear of the first stop means and to retain the film in such position to allow said lever to be pivoted in the sense away from the rod element by movement of the latter on operation of the shutter mechanism to expose the film, the spring after such exposure returning the lever to the position where it is engaged by the first stop means, whereby the rod element cannot be actuated by the shutter mechanism and further exposure of the film is prevented.

5. For the elimination of double exposures in photographic cameras, control mechanism comprising a rod element adapted to be operated by a shutter control mechanism on exposure of a film, a lever in contact along one of its longitudinal edges with the free end of the rod element and having a longitudinal slot adjcent one of its ends, a pin element fixedly mounted in a camera body and extending through said slot so that the lever can move in the direction of its axis and can pivot about a point on its axis, a projection on the end of the lever adjacent the slot extending outwardly substantially in the plane of the lever in a direction substantially normal to the axis of the lever, a spring anchored to the end of the projection remote from the lever and to a camera body adjacent the end of the lever remote from the projection to pull the lever in the longitudinal direction and to pivot same in the sense towards the rod element, first stop means fixed on the camera body adapted to arrest longitudinal movement of the lever under the action of the spring and to lock same against pivotal movement in the sense away from the rod element, second stop means fixed on the camera body adapted to lock the lever against pivotal movement in the sense towards the rod element, and means actuable on rotation of a film transporter-shaft for bringing a film to the exposure position to move said lever in the longitudinal direction against the action of the spring clear of the first stop means and to retain the film in such position to allow the lever to be pivoted in the sense away from the rod element by movement of the latter on operation of the shutter mechanism to expose said film, the spring after such exposure returning the lever to the position where it is engaged by the first stop means, whereby the rod element cannot be actuated by the shutter mechanism and further exposure of the film is prevented.

6. For the elimination of double exposures in photographic cameras, control mechanism comprising a rod element adapted to be operated by the shutter control mechanism on exposure of a film, lever means in contact with the free end of the rod element and mounted for longitudinal movement in the direction of its axis and for pivotal movement about a point on its axis, spring means anchored to a camera body and to the lever means to pull the latter in the longitudinal direction and to pivot same in the sense towards the rod element, first stop means fixed on the camera body adapted to arrest longitudinal movement of the lever means under the action of the spring means and to lock same against pivotal movement in the sense away from the rod element, second stop means fixed on the camera body adapted to lock the lever means against pivotal movement in the sense towards the rod element, an abutment on the part of the lever means between the two stop means and spaced from the second stop means, a collar on a film transporter-shaft, at least one cam on said collar adapted on rotation of the film transporter-shaft for bringing a film to the exposure position, said cam contacting the abutment to move said lever means in the longitudinal direction against the action of the spring means clear of the first stop means, and to retain the film in such position and to allow the lever means to be pivoted in the sense away from the rod element by movement of the latter on operation of the shutter mechanism to expose the film, the spring means after such exposure returning the lever means to a position where the abutment is behind the trailing edge of the cam which previously engaged it and the lever is engaged by the first stop means, whereby the rod element cannot be actuated by the shutter mechanism and further exposure of the film is prevented.

7. For use with a camera, a control mechanism for elimination of double exposures comprising a rod element supported for axial movement in camera body and operable by a shutter control mechanism upon exposure of a film, a lever slidable axially and pivotable by said rod element means on said camera body for guiding said lever during movement, projections on said lever means, limit stops affixed to the camera body and positioned to control forward axial displacement of said lever by contacting the projection thereon, means to urge said lever in the forward direction against a limit stop, a film transporter-shaft supported for rotation in said camera body, a cam disk having a projection thereon frictionally mounted on said shaft for moving a film into position, said cam disk projection in juxtaposition to engage with a projection on said lever to shift same axially rearward upon transporter-shaft rotation to strike a limit stop whereby upon further rotation of said transporter-shaft results in slipping of the cam disk thus retaining the film in a fixed position and upon subsequent actuation of the shutter control mechanism the rod element is moved so as to pivot the lever out of engagement with the rearward limit stop and to ride over the cam disk projection to become urged forward into a locked position with another limit stop thereby preventing further rod element movement without level displacement.

References Cited in the file of this patent

UNITED STATES PATENTS

| | | |
|---|---|---|
| 2,218,241 | Hughey | Oct. 15, 1940 |
| 2,227,964 | Drotning | Jan. 7, 1941 |
| 2,231,730 | Mihalyi | Feb. 11, 1941 |
| 2,478,394 | Harvey | Aug. 9, 1949 |

FOREIGN PATENTS

| | | |
|---|---|---|
| 528,942 | Germany | July 6, 1931 |
| 213,437 | Switzerland | May 1, 1941 |
| 844,404 | Germany | July 21, 1952 |